Feb. 6, 1962 C. F. SCHAEFER ETAL 3,020,533

CYCLIC ANALOGUE TO DIGITAL CONVERTER

Filed Jan. 31, 1956 2 Sheets-Sheet 1

INVENTORS
CARL F. SCHAEFER
JACK B. SPELLER
BY Harry L. Shenier
ATTORNEY

INVENTORS
CARL F. SCHAEFER
JACK B. SPELLER
BY Henry L. Shenier
ATTORNEY 3,020,533

CYCLIC ANALOGUE TO DIGITAL CONVERTER

Carl F. Schaefer, Pleasantville, and Jack B. Speller, Chappaqua, N.Y., assignors, by mesne assignments, to United Aircraft Corporation, East Hartford, Conn., a corporation of Delaware Filed Jan. 31, 1956, Ser. No. 562,438
13 Claims. (Cl. 340—347)

Our invention relates to an analogue to digital converter and more particularly to a cyclic analogue to digital converter which provides an unambiguous digital representation in the natural binary code as a predetermined function of mechanical rotation where the maximum count, the number of representations, is other than an integral power of the number 2.

The copending application of Jack B. Speller, Serial No. 464,774, filed October 26, 1954, now Patent No. 2,873,440, discloses an analogue to digital converter which provides an unambiguous digital representation as a predetermined function of mechanical displacement in the natural binary code. In the special case where the maximum count is an integral power of the number 2, the said converter is adapted to be cyclic; that is, the maximum count is followed immediately by zero, and the maximum count and zero are adjacent representations. In many instances it is desirable that mechanical rotation be represented by a cyclic maximum count which is other than an integral power of the number 2. If an attempt be made to use the pattern or logic of the converter disclosed in the said copending application, an ambiguity arises in the converter output.

We have invented a cyclic analogue to digital converter which produces an unambiguous representation of mechanical rotation in the natural binary code where the cyclic maximum count is other than an integral power of the number 2.

In converters of the prior art that solve the problem of preventing ambiguity from arising at transfer points, numerous auxiliary logic or switching circuits are needed and much additional gearing is required to produce even small maximum counts. These unambiguous converters of the prior art, therefore, have many moving parts, numerous components, require a large driving torque, and are very bulky, heavy, and expensive to manufacture.

One object of our invention is to provide a cyclic analogue to digital converter for producing an unambiguous representation of mechanical rotation in the natural binary code where the number of representations is other than an integral power of the number 2.

Another object of our invention is to provide a cyclic analogue to digital converter which requires only a small driving torque.

Still another object of our invention is to provide a cyclic analogue to digital converter which requires a negligible amount of power.

A further object of our invention is to provide a cyclic analogue to digital converter which may be driven at high speed yet which may be read without arresting the input shaft.

Another object of our invention is to provide a cyclic analogue to digital converter which is small and light.

Another object of our invention is to provide a cyclic analogue to digital converter which need employ only one auxiliary logic or switching circuit, where all other switching operations are performed internally.

Another object of our invention is to provide a cyclic analogue to digital converter in which cascading of stages provides increased tolerances.

Other and further objects of our invention will appear from the following description.

As has been explained hereinabove, the analogue-to-digital converter disclosed in the copending application is adapted to produce an unambiguous digital representation of any number which is an integral power of the number 2. When, however, the number to be represented is not an integral power of 2, ambiguity is introduced. For example, successively dividing the number 60 by 2 on the third operation, we arrive at a fractional number. In accordance with the disclosure of the copending application, it would become necessary to provide a fractional segment in the row corresponding to the fractional number, and ambiguity would be introduced at the transfer point of this row in going, for example, from the fractional count to zero. We have now invented an analogue-to-digital converter which eliminates this possible source of ambiguity while retaining, insofar as is possible, the desirable feature of the copending application which permits the brush tolerance to be increased going from the least significant toward the most significant row.

In general, our invention contemplates the provision of a converter having a plurality of concentric coded conductive circles carried by an insulating disk. Our converter gives a binary digital representation as a predetermined function of the angular displacement of the input shaft from a given zero position. The outermost circle, or that of greatest circumference, is composed of alternate predetermined lengths of arc of conductive segments spaced predetermined distances to form nonconductive spaces. This outermost circle represents the least significant digit of the disk and the sum of the segments and intersegment spaces is the maximum count of the disk or the total number of representations, which number need not be an integral power of the number 2. The number of concentric circles is equal to that integral power of the number 2 which would provide a maximum count at least equal to that desired. The count of each circle proceeding from the outermost to the innermost is diminished by a factor of 2 for each succeeding circle. For certain of the inner circles we may replace the nonconductive spaces by secondary conductive segments from which a complementary output may be derived. The conducting segments of each particular circle are connected to corresponding slip rings. For those inner circles where the intersegmental spaces have been replaced by secondary conductive segments, these secondary conductive segments are connected to corresponding secondary slip rings. A brush contacting each of the primary slip rings enables us to obtain an output signal representative of a binary digit or bit for each circle. By a brush contacting each of the secondary slip rings which may be present we obtain complementary outputs. An input brush contacting the outermost circle of segments is supplied with excitation voltage. Auxiliary logic circuitry associated with this outermost circle simulates the presence and action of the secondary conducting segments and secondary slip ring for the outermost circle. Two input brushes of a predetermined spacing are provided for each of the inner circles. Generally the two inputs to a particular circle will be derived from the two outputs of the immediately preceding circle. However, there will be at least one circle whose two inputs will be derived from the two outputs of a remote preceding circle. In a cyclic converter of the type disclosed in the said copending application, since the maximum count must always be an integral power of the number 2, diminishing the count by 2 for each successive circle proceeding from the outermost will result in an even number. When, as in this application, it is desired to have a maximum count which is not an integral power of the number 2, the point at which the two inputs to a particular circle are derived from the two outputs of a remote preceding circle may be determined by dividing the count by 2 a number of times until the result yields an odd number. The number of times the dividing operation is performed to arrive at the odd number will then be equal to the number of outer circles where we cascade by obtaining inputs from immediately preceding outputs. As in the said copending application the input brushes to a particular circle are spaced apart a distance equal to one-half the length of the shortest segment of that particular circle thereby providing a tolerance of substantially plus or minus one-quarter the length of that segment. At the transfer points the conduction is shifted instantaneously from one brush to the other thereby similarly preventing ambiguity.

In the accompanying drawings which form part of the instant specification and which are to be read in conjunction therewith and in which like reference numerals are used to indicate like parts in the various views.

Figure 1:
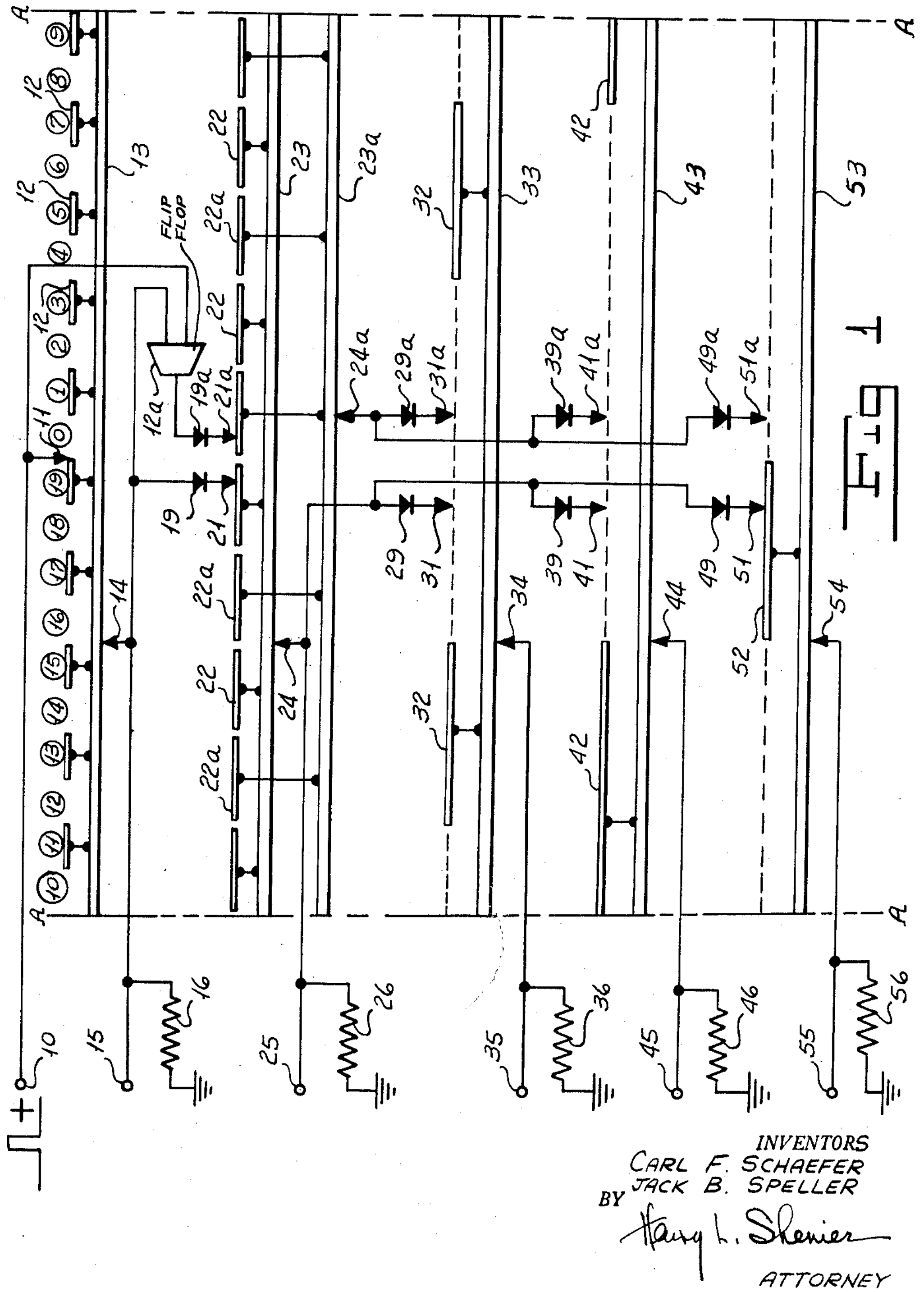
FIGURE 1 is a schematic developed view of one form of our cyclic analogue to digital converter showing the rotatable disk pattern of segments and slip rings, which has been cut along the line A—A and developed, and showing the arrangement of the stationary brushes.

More particularly referring now to FIGURE 1 of the drawings in which our cyclic converter has a maximum count of 20, that is, 0 to 19 to 0, an input terminal 10 is supplied with an input signal which may be either a positive D.C. voltage or a positive going pulse as indicated. Input terminal 10 is connected to a stationary input brush 11 and to one of the two inputs to an auxiliary logic switching circuit 12*a*. Input brush 11 is disposed so as alternately to contact segments 12 of the outermost circle. Since the maximum count is 20, we provide ten equal segments 12 so spaced as to define ten equal intersegment spaces. It will be appreciated that this configuration will yield a representation which is a linear function of mechanical rotation. The encircled numbers in FIGURE 1 represent the successive decimal count as the rotatable disk is moved under the stationary brushes. Each of the segments 12 is connected to a slip ring 13. Stationary output brush 14, which contacts slip ring 13 is connected to output terminal 15 and to ground through loading resistor 16. Brush 14 is also connected to input brush 21 of a second circle of segments through a crystal 19 and to the other input terminal of auxiliary logic circuit 12*a*. The output of auxiliary circuit 12*a* is connected through a crystal 19*a* to the other input brush 21*a* of the second circle of segments. Input brushes 21 and 21*a* are disposed to contact alternately the primary segments 22 and the secondary segments 22*a* of the second circle. The spacing between brushes 21 and 21*a* is one-half the length of the equal segments 22 and 22*a*. Each of the five segments 22 is connected to a primary output slip ring 23. Each of the five segments 22*a* is connected to a secondary output slip ring 23*a*. An output brush 24, which contacts slip ring 23, is connected to output terminal 25, to ground through loading resistor 26, and to one input brush 31 of a third circle through a crystal 29. A complementary output brush 24*a*, contacting auxiliary slip ring 23*a*, is connected through a crystal 29*a* to the other input brush 31*a* of the third circle, which comprises two equal primary segments 32, each connected to a slip ring 33. Stationary input brushes 31 and 31*a* are spaced apart half the length of a segment 32. An output brush 34 which contacts slip ring 33 is connected to third circle output terminal 35 and to ground through loading resistor 36. The count of the first circle will be 20, the count of the second circle will be 10, the count of the third circle, however, will be 5, an odd number. Hence, the input to the fourth circle may be derived from the output of a remote preceding circle. Output brush 24 of the second circle is also connected through crystal 39 to one stationary input brush 41 of a fourth circle. Output brush 24*a* of the second circle is also connected through crystal 39*a* to the other stationary input brush 41*a* of the fourth circle. It will be seen that the output from the second circle supplies the two input brushes for each of the third and fourth circles and there is no cascading effect, hence, the brush spacing between brushes 41 and 41*a* will be the same as that between brushes 31 and 31*a*. A segment 42 which is alternately contacted by brushes 41 and 41*a* is connected to a fourth circle slip ring 43. Stationary fourth circle output brush 44 which contacts slip ring 43 is connected to fourth circle output terminal 45 and to ground through a loading resistor 46. A fifth circle segment 52 is connected to a slip ring 53 which is contacted by a stationary fifth circle output brush 54. Output brush 54 is connected to fifth circle output terminal 55 and to ground through loading resistor 56. The inputs to the fifth circle must be derived from the output of a remote preceding circle whose transfer points coincide with those of the fifth circle. It can be seen that the transfer points of the first circle and the second circle are coincident with those of the fifth circle. To provide the largest possible tolerance, we derive the inputs to the fifth circle from the outputs of the second circle, since the periodicity of switching in the second circle is lower than that in the first circle. We then connect output brush 24 of the second circle through crystal 49 to one input brush 51 of the fifth circle; and we connect auxiliary output brush 24*a* through a crystal 49*a* to the other input brush 51*a* of the fifth circle. The spacing between input brushes 51 and 51*a* will then be the same as that between brushes 41 and 41*a* and between brushes 31 and 31*a*. Output terminal 15 of the first circle provides the least significant digit. The fifth circle output terminal 55 will provide the most significant digit. The output from terminals 15, 25, 35, 45, and 55 provide a representation in the natural binary code as a linear function of mechanical rotation. It will be appreciated that the polarity of the crystals 19, 19*a*, 29, 29*a*, 39, 39*a*, 49, and 49*a* is such that they will pass a positive signal or positive going pulses to subsequent circles. These crystals prevent feedback from a subsequent circle to a preceding circle when the two input brushes of a particular circle contact the same segment. Loading resistors 16, 26, 36, 46, and 56, whose resistance values are much less than the back resistances of the crystals, ensure the return of the output terminals 15, 25, 35, 45, and 55 to ground when no signal is being passed. It will be appreciated that five circles would permit a maximum count of $2^5=32$, which is greater than 20, whereas four circles would permit a maximum count of only $2^4=16$, which is less than 20, the desired maximum count in this instance. Therefore, we must use five circles to accomplish a maximum count of 20. It will be appreciated that the inputs to the fourth circle could have been derived from the outputs of the third circle by providing auxiliary segments in the spaces and an auxiliary slip ring, thereby obtaining a cascaded, larger brush spacing for the fourth circle. Although in general this would not be possible, it can be done for a maximum count of 20, since the transfer points for the fourth circle are coincident with those of the third circle, and there is a two-to-one relationship of the segments and spaces between transfer points.

In operation, where the disk is rotated to lie under the brushes in the position shown in FIGURE 1, brush 11 is at a transfer point between 19 and 0. If input brush 11 is contacting the first circle segment 12 in the nineteenth position, a positive pulse or positive D.C. voltage will appear at output terminal 15 and also at output terminal 25 of the second circuit to represent at each terminal a "1." As is well known in the art, auxiliary logic circuit 12*a* may be a flip-flop, toggle, or trigger circuit which will produce zero output voltage when its two inputs are equal and a positive output voltage when its two inputs are unequal. A simple Eccles-Jordan circuit arranged to cause equal coincident inputs to cancel each other so that the circuit is not triggered and to cause unequal inputs to trigger the circuit may be used for the logic circuit 12*a*.

If desired, we could use any of the means disclosed in the copending application referred to hereinabove as the circuit element 12*a* for deriving the complementary outputs applied to brushes 21 and 21*a*. When input brush 11 is contacting a segment 12 in the nineteenth position, equal inputs will be applied to switching circuit 12*a* and the output voltage of circuit 12*a* will be zero. If the disk were to be moved slightly so that input brush 11 broke contact with the segment 12 in the nineteenth position and entered the intersegment space of the zero position, no output would appear at terminal 15, thereby representing a "0." The two inputs to auxiliary circuit 12*a* would be unequal and a positive voltage would appear at its output terminal. Since the transfer point for the second circle corresponds to that for the first circle no ambiguity would result since conduction will be instantaneously shifted from brush 21 on segment 22 to brush 21*a* on segment 22*a*. A "0" will then appear at output terminal 25. It can be seen that the allowable brush tolerance for switching at a transfer point is ±¼ the length of a segment. At this recycling transfer point where the input brush is going from the nineteenth to the zero position, the fifth circle is also at a transfer point and conduction will be shifted from brush 51 providing a signal at output terminal 55 to brush 51*a* which is contacting only the insulating disk at this time, thereby allowing terminal 55 to return to ground and thereby representing a "0" for the most significant digit. As the rotatable disk moves under the stationary brushes, conduction will be transferred back and forth between brushes 21 and 21*a*, 31 and 31*a*, 41 and 41*a*, and 51 and 51*a*, alternately. This alternate stepping action causes conduction, in effect, to jump across transfer points thereby preventing ambiguities from arising and allowing a tolerance of ±¼ the length of a particular segment. The two inputs to a particular circle will be complementary; that is, when one represents a "0," the other represents a "1" and vice versa. When two outputs are obtained from a circle, they will be similarly complementary. It will be appreciated that since 20 can be divided by $2^2=4$ before yielding the odd number 5, cascading of the first two circles provides an increase in brush spacing and an increase in allowable tolerance, since the inputs to the second circle are derived from the outputs of the first circle and the inputs to the third, fourth, and fifth circles are derived from the outputs of the second circle. As input brush 11 successively occupies positions 0, 1, 2, . . . 18, 19, and 0 again, as represented by the encircled numbers, the outputs appearing at terminals 15, 25, 35, 45, and 55 will be as in the following table:

| Decimal Count and Position | Output at Terminals | | | | | Binary Count |
|---|---|---|---|---|---|---|
| | 55 | 45 | 35 | 25 | 15 | |
| 0 | 0 | 0 | 0 | 0 | 0 | 00000 |
| 1 | 0 | 0 | 0 | 0 | 1 | 00001 |
| 2 | 0 | 0 | 0 | 1 | 0 | 00010 |
| 3 | 0 | 0 | 0 | 1 | 1 | 00011 |
| 4 | 0 | 0 | 1 | 0 | 0 | 00100 |
| 5 | 0 | 0 | 1 | 0 | 1 | 00101 |
| 6 | 0 | 0 | 1 | 1 | 0 | 00110 |
| 7 | 0 | 0 | 1 | 1 | 1 | 00111 |
| 8 | 0 | 1 | 0 | 0 | 0 | 01001 |
| 9 | 0 | 1 | 0 | 0 | 1 | 01001 |
| 10 | 0 | 1 | 0 | 1 | 0 | 01010 |
| 11 | 0 | 1 | 0 | 1 | 1 | 01011 |
| 12 | 0 | 1 | 1 | 0 | 0 | 01100 |
| 13 | 0 | 1 | 1 | 0 | 1 | 01101 |
| 14 | 0 | 1 | 1 | 1 | 0 | 01110 |
| 15 | 0 | 1 | 1 | 1 | 1 | 01111 |
| 16 | 1 | 0 | 0 | 0 | 0 | 10000 |
| 17 | 1 | 0 | 0 | 0 | 1 | 10001 |
| 18 | 1 | 0 | 0 | 1 | 0 | 10010 |
| 19 | 1 | 0 | 0 | 1 | 1 | 10011 |
| 0 | 0 | 0 | 0 | 0 | 0 | 00000 |

Figure 2:
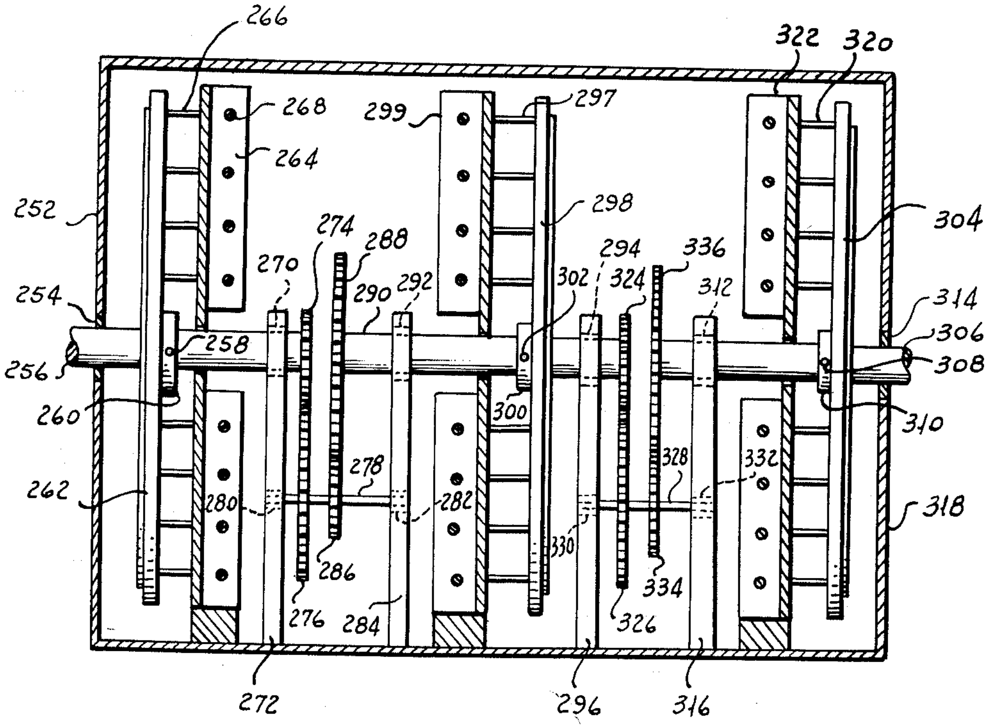
FIGURE 2 is a sectional view of another form of our cyclic analogue to digital converter in which three disks are employed.

Referring now to FIGURE 2, a form of our cyclic converter which divides a period of four hours into tenths of seconds including a housing, one side 252 of which carries a first bearing 254, which rotatably mounts the first disk input shaft 256 driven by a constant speed motor (not shown) at the rate of one revolution per minute. A set screw 258 or the like fixes the hub 260 of the first disk 262 to shaft 256. Disk 262 carries a plurality of conducting circles including segments and slip rings arranged in a pattern to divide a single revolution of shaft 256 into six hundred equal parts, since a linear function of time is desired. A brush mounting means 264 carries the brushes 266 associated with disk 262. Adjusting screws 268 are provided accurately to position the brushes 266. The pattern of the segments and the arrangement of the brushes 266 associated with disk 262 were determined in a similar manner outlined in connection with FIGURE 1. Ten conductive circles were required for the disk since $2^{10}=1024$, whereas nine circles would have provided a maximum count of only 512 which is less than the count of 600 desired. The outer circle includes three hundred conductive segments and three hundred intersegment spaces yielding the desired maximum count of 600. Since 600 can be divided by $2^3=8$ before resulting in the odd number 75, three stages of cascading may be employed, that is, the inputs to the second stage are derived from the outputs of the first stage, the inputs of the third stage are derived from the outputs of the second stage and the inputs of the remaining seven stages may all be derived from the outputs of the third stage. It is desirable to employ cascading to as great an extent as possible in order to increase the allowable tolerances. The first disk 262 is the seconds disk, one revolution corresponding to one minute and the maximum count of 600 providing a minimum representation of one-tenth second. Shaft 256 is supported in a second bearing 270 carried by a mounting member 272 secured to the housing. A pinion 274 fixed on shaft 256 for rotation therewith meshes with a gear 276 fixed on a shaft 278 rotatably mounted in bearings 280 and 282 carried respectively by first mounting member 272 and by a second mounting member 284. A second pinion 286 also fixed on shaft 278 meshes with a gear 288 fixed on a minutes disk shaft 290 rotatably mounted by bearings 292 and 294, respectively, in the second mounting member 284 and a third mounting member 296. Shaft 290 rotatably mounts the minutes disk 298 whose hub 300 is secured to shaft 290 by a set screw 302. Disk 298 carries a pattern of segments and slip rings whose cyclic maximum count is 60. One revolution of disk 298 represents one hour, the reduction between shafts 256 and 290 afforded by the gear train including pinion 274, gear 276, pinion 286 and gear 288 being 60:1. Brushes 297 carried by a brush mounting member 299 engage the pattern of disk 298. The outermost circle of the second or minutes disk will not, in this case, provide the least significant digit of the device. The two inputs in this case to the outermost circle of the second or minutes disk are derived from two outputs of the innermost circle of disk 262. In other words, cascading is provided between disks. For the innermost circle of disk 262 the circle providing the most significant digit of disk 262, the spaces are replaced by auxiliary segments, an auxiliary slip ring is provided, and two complementary outputs are obtained. These are six circles on disk 298, since $2^6=64$ is greater than the desired maximum count of 60. Since 60 can be divided by $2^2=4$ before yielding the odd number 15, two additional stages of cascading may be used on the second or minutes disk 298. A pinion 324 fixed on shaft 290 meshes with gear 326 fixed on a shaft 328 which is supported by bearings 330 and 332 carried, respectively, by third mounting member 296 and a fourth mounting member 316. A pinion 334 fixed to intermediate shaft 328 meshes with gear 336. Gear 336 is fixed on a shaft 306 which is supported by bearings 312 and 314 carried, respectively, by the fourth mounting member 316 and the other side 318 of the housing. The third or hours disk 304 is fixed on shaft 306 by means of a set screw 308 through its hub 310. As we have previously indicated, the total period desired was four hours, and the pattern of segments and circles on disk 304 will be the same as in the said copending application. In this case, again, the outermost circle of segments will not provide the least significant digit of the device, hence, two inputs are required and these are derived from the innermost circle of segments of the preceding disk 298. Since the third disk has a maximum count of $2^2=4$, cascadings will be employed for all circles. The reduction provided by the gear train including pinion 324, gear 326, pinion 334, and gear 336 is 4:1. The conductive circles or rings of teeth may be applied to the insulating disks in any suitable manner such, for example, as that disclosed in the said copending application. Each of the disks 262 and 298 contains one embodiment of our invention in that the maximum count of these first two disks is an even number but which is not an integral power of the number 2 and consequently the inputs to subsequent circles are derived from the outputs of remote preceding circles of a particular disk. The third disk 304 whose maximum count is $4=2^2$, an integral power of the number 2, is disclosed in the said copending application. It will be seen then that $60\times4=240$ revolutions of input shaft 256 will cause one revolution of shaft 306 and disk 304 and will complete one cycle of operation. The total count of the device will be $600\times60\times4=144{,}000$.

From the structure described it will readily be appreciated that the disk 262 for example and the brush holder 264 may be considered to be first and second members with shaft 256 and the housing having sides 252 and 318 providing a means for mounting the first and second members for relative rotation. The circle of segments 12, the circle of segments 22 and 22*a* and the circle of segments 32 make up a plurality of consecutive circles of conductive segments mounted on the first member. Terminal 10 provides a source of input excitation voltage. The brush 14 and the circuit 12*a* and the brushes 24 and 24*a* provide means for obtaining two outputs complementary to each other from each but the last circle of the plurality of consecutive circles, the last circle of which is the circle of segments 32. Brushes 21 and 21*a* and brushes 31 and 31*a* provide a means for coupling to each but the first circle (the circle of segments 12) of the plurality of consecutive circles two inputs complementary to one another derived directly from the two complementary to one another derived directly from the two complementary outputs of the immediately preceding circle. Brush 11 provides means for coupling the input excitation to the rsfit circle of segments 12. The circle of segments 52 is a subsequent circle of segments. Brush 54 provides a means for obtaining an output from this subsequent circle. Brushes 51 and 51*a* connected to brushes 24 and 24*a* are means for coupling to the subsequent circle (circle of segments 52) two complementary inputs derived directly from the two complementary outputs of the penultimate (circle of segments 22 and 22*a*) of said plurality of consecutive circles.

It will be seen that we have accomplished the objects of our invention. We have provided a cyclic analogue to digital converter which provides an unambiguous representation in the natural binary code as an arbitrary function of shaft rotation where the cyclic maximum count is merely an even number and need not be an integral power of the number 2. This is accomplished by providing at certain times that the inputs to subsequent circles be derived directly from the outputs of remote preceding circles. Our cyclic analogue to digital converter requires only a small driving torque because the only friction associated with our device is the negligible amount of the friction of the contact brushes. The power consumed within our device is negligible since contact resistance is very low, crystals are highly efficient, and the high back resistance of crystals enables large loading resistance values to be used. Our converter is adapted to run at high speed. Since the response of the auxiliary logic circuit is essentially instantaneous, the only limitation is loss of brush contact at extremely high rotating speeds. As long as contact can be maintained, the output of the device can be read without arresting the input shaft. Our converter is small and light, since one disk can provide an extremely large maximum count for a small diameter, the number of disks needed for a given total maximum count will be correspondingly reduced. Only one gear train is needed for each additional disk. The disks being conveniently fabricated of plastic insulating material, their weight will be small and the moment of inertia correspondingly small. Furthermore, since all switching operations take place automatically, that is, since the segments and brushes themselves act as switches, only one auxiliary logic or switching circuit is required, namely, the auxiliary logic circuit for the least significant digit. The additional components include several small crystals and several high resistance resistors of only a small wattage rating. If we desire we may cascade stages wherever possible, that is, derive inputs to subsequent stages from the outputs of immediately preceding stages, thereby increasing the allowable tolerance and simplifying manufacture and assembly.

It will be understood that certain features and subcombinations are of utility and may be employed without reference to other features and subcombinations. This is contemplated by and is within the scope of our claims. For example, the consecutive circles of conducting segments may be mounted on a drum instead of on a disk. It is further obvious that various changes may be made in details within the scope of our claims without departing from the spirit of our invention. It is therefore to be understood that our invention is not to be limited to the specific details shown and described.

Having thus described our invention, what we claim is:

1. A cyclic analogue to digital converter for producing a binary digital representation of the relative rotation between two members including in combination a first member, a second member, means mounting the first and second members for relative rotation, a plurality of consecutive circles of conductive segments mounted on the first member, a source of input excitation voltage, means for obtaining two outputs complementary to one another from each but the last circle of said plurality of consecutive circles, means for obtaining an output from the last circle, means including means mounted on the second member for coupling to each but the first circle of said plurality of consecutive circles two inputs complementary to one another derived directly from the two complementary outputs of the immediately preceding circle, means including means mounted on the second member for coupling the input excitation to the first circle, a subsequent circle of conductive segments mounted on the first member, means for obtaining an output from the subsequent circle, and means including means mounted on the second member for coupling to the subsequent circle two complementary inputs derived directly from the two complementary outputs of the penultimate of said plurality of consecutive circles.

2. A cyclic analogue to digital converter as in claim 1 where the first member is a rotatably mounted nonconductive disk.

3. A cyclic analogue to digital converter as in claim 1 where the first circle includes two conductive segments each of predetermined length of arc spaced apart a predetermined length of arc thereby to define a nonconductive space of predetermined length of arc therebetween.

4. A cyclic analogue to digital converter as in claim 1 where the means for obtaining two complementary outputs from the first circle includes a slip ring, where the first circle includes two conductive segments spaced apart thereby to define a nonconductive space therebetween, and where the two segments are connected to the slip ring.

5. A cyclic analogue to digital converter as in claim 1 where the means for obtaining two complementary outputs from the first circle includes auxiliary logic circuitry.

6. A cyclic analogue to digital converter as in claim 1 where the second circle includes two conductive segments each of predetermined length of arc separated by an auxiliary conducting segment of predetermined length of arc.

7. A cyclic analogue to digital converter as in claim 1 where the means for obtaining two complementary outputs from the second circle includes a first slip ring and an auxiliary slip ring, where the second circle includes two conductive segments separated by an auxiliary conducting segment, and where the two segments are connected to the first slip ring and the auxiliary segment is connected to the auxiliary slip ring.

8. A cyclic analogue to digital converter as in claim 1 where the input excitation coupling means includes a brush mounted on the second member and disposed to contact the segments of the first circle.

9. A cyclic analogue to digital converter as in claim 1 where the means for coupling the two complementary inputs to the second circle includes two brushes spaced apart a predetermined length of arc mounted on the second member and disposed to contact the segments of the second circle.

10. A cyclic analogue to digital converter as in claim 1 where the means for coupling the two complementary inputs to the second circle includes two unilateral impedances.

11. A cyclic analogue to digital converter as in claim 1 where the second circle includes two conductive segments each of predetermined length of arc spaced apart a predetermined length of arc, where the means for obtaining an output from the second circle includes a slip ring, and where the two conductive segments are connected to the slip ring.

12. A cyclic analogue to digital converter for producing a binary digital representation of the relative rotation between two members including in combination a first member, a second member, means mounting the first and second members for relative rotation, a first plurality of consecutive circles of conductive segments mounted on the first member, a source of input excitation voltage, means for obtaining two outputs complementary to one another from each but the last circle of the first plurality of consecutive circles, means for obtaining an output from the last circle, means including means mounted on the second member for coupling the input excitation to the first circle, a subsequent plurality of consecutive circles of conductive segments mounted on the first member, means for obtaining an output from each circle of the subsequent plurality of consecutive circles, means including means mounted on the second member for coupling two complementary inputs to each but the last circle of the subsequent plurality of consecutive circles, and means including means mounted on the second member for coupling to the last of the subsequent plurality of consecutive circles two complementary inputs derived directly from the two complementary outputs of the penultimate of the first plurality of consecutive circles.

13. An analogue-to-digital converter for producing a digital representation of the relative rotation between two members including in combination a first member, a second member, means mounting the first and second members for relative rotation, a plurality of consecutive digit producing devices mounted on the first member, means for obtaining two outputs complementary to one another from each but the last of said digit producing devices, means for coupling to each but the first of said devices the two complementary outputs of the immediately preceding digit producing device, means including means mounted on the second member for exciting the first digit producing device, a subsequent digit producing device mounted on the first member, and means independent of the last device of the plurality for coupling to the subsequent digit producing device the two complementary outputs of the penultimate of the plurality of consecutive digit producing devices.

References Cited in the file of this patent

UNITED STATES PATENTS

| | | |
|---|---|---|
| 2,666,912 | Gow | Jan. 19, 1954 |
| 2,747,797 | Beaumont | May 29, 1956 |
| 2,750,584 | Goldfischer | June 12, 1956 |
| 2,809,369 | Feeney | Oct. 8, 1957 |
| 2,818,557 | Sink | Dec. 31, 1957 |
| 2,866,184 | Gray | Dec. 23, 1958 |
| 2,873,440 | Speller | Feb. 10, 1959 |

OTHER REFERENCES

"A Digital Converter," by Speller, J. B., Proceedings of the WESCON Computer Sessions, August 25–27, 1954, pp. 29–31.